United States Patent [19]

Pennock

[11] Patent Number: 5,074,251
[45] Date of Patent: Dec. 24, 1991

[54] ILLUMINATED PET COLLAR

[75] Inventor: Kenneth M. Pennock, Sarasota, Fla.

[73] Assignee: Nancy A. Pennock, Sarasota, Fla.

[21] Appl. No.: 607,257

[22] Filed: Oct. 31, 1990

[51] Int. Cl.$^5$ ............................................. A01K 27/00
[52] U.S. Cl. ..................................... 119/106; 362/108
[58] Field of Search ................ 119/106, 109; 362/103, 362/104, 108, 222, 223, 249

[56] References Cited

U.S. PATENT DOCUMENTS

| | | | |
|---|---|---|---|
| 3,641,333 | 2/1972 | Gendron | 362/108 |
| 3,714,414 | 1/1973 | Sternius | 362/249 |
| 3,944,803 | 3/1976 | Chao | 119/106 |
| 4,652,981 | 3/1987 | Glynn | 362/108 |
| 4,885,664 | 12/1989 | Hermanson | 362/249 |
| 4,887,552 | 12/1989 | Hayden | 119/109 |
| 4,909,189 | 3/1990 | Minotti | 119/106 |

Primary Examiner—Robert P. Swiatek
Assistant Examiner—Todd E. Monahan
Attorney, Agent, or Firm—Charles J. Prescott

[57] ABSTRACT

An illuminable pet collar including a housing for a battery power source and an elongated, flexible, pliable, transparent plastic display tube having a plurality of spaced apart miniature lights operably connected therewithin and along substantially the entire length of the display tube. The housing includes a stem or extension tube extending from each end thereof sized to be snugly inserted into each end of the display tube. Electrical connection between the battery and the outer surface of one stem communicates electrical power to the lights which are parallel-wired within the display tube to allow for the shortening of the display tube to any desired length by severing through the tube (and the wiring between the lights, if required). A switch on the housing activates the lights within the display tube as desired.

3 Claims, 1 Drawing Sheet

ILLUMINATED PET COLLAR

BACKGROUND OF THE INVENTION

This invention relates generally to illuminated pet collars, and more particularly to a pet collar which includes a removable transparent tube into which a plurality of lights are operably connected for viewing.

A number of illuminated pet collars are known in prior art. One such device is disclosed in U.S. Pat. No. 4,173,201 to Chao which is directed to a collar having a row of small electric lamps studded around the collar. Another prior art device known to applicant is disclosed in U.S. Pat. No. 4,895,110 to LoCascio. This invention is directed to a collar having a light source and a power source along a strap member, the electrical circuitry being completed only when the strap member is engaged around the pet's neck.

Yet another invention known to applicant is disclosed in U.S. Pat. No. 4,909,189 to Minotti which is directed to an illuminated pet collar having a self-fastening strip of material which includes a reflective strip or lights.

The present invention provides an illuminated pet collar formed primarily of a removable elongated transparent tubular member into which a plurality of spaced apart miniature lights are disposed there along. The invention provides for detachment of this tubular light carrying member and for the convenient shortening of its length to accommodate a broad pet size range and for its replacement.

BRIEF SUMMARY OF THE INVENTION

This invention is directed to an illuminable pet collar including a housing for a battery power source and an elongated, flexible, pliable, transparent plastic display tube having a plurality of spaced apart miniature lights operably connected therewithin and along substantially the entire length of the display tube. The housing includes a stem or extension tube extending from each end thereof sized to be snugly inserted into each end of the display tube. Electrical connection between the battery and the outer surface of one stem communicates electrical power to the lights which are parallel-wired within the display tube to allow for the shortening of the display tube to any desired length by severing through the tube (and the wiring between the lights, if required). A switch on the housing activates the lights within the display tube as desired.

It is therefore an object of this invention to provide an illuminated pet collar formed of a smooth, transparent tubular member having a plurality of spaced miniature lights operably disposed therewithin and there along.

It is yet another object of this invention to provide an illuminated pet collar which is easily adjustable in length.

It is yet another object of this invention to provide an illuminated pet collar which fully conceals and protects the miniature lights from contact with the pet.

It is yet another object of this invention to provide for interchangeable ornamental miniature light carrying tubular members of an illuminated pet collar to achieve a broad range of ornamental distinctiveness.

In accordance with these and other objects which will become apparent hereinafter, the instant invention will now be described with reference to the accompanying drawings.

DETAILED DESCRIPTION OF THE INVENTION

Figure 1:
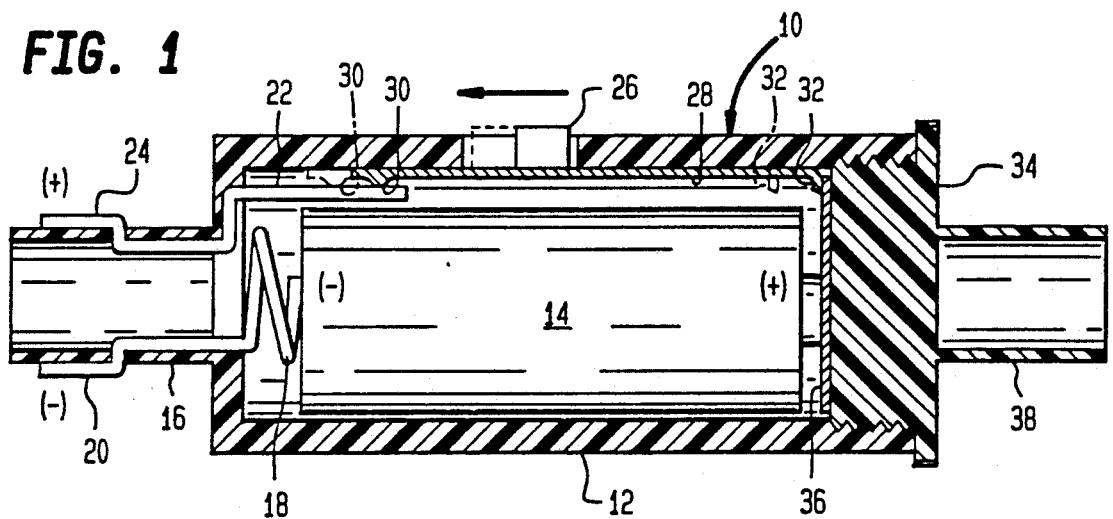
FIG. 1 is a longitudinal section view of the battery housing of the present invention.
Figure 3:
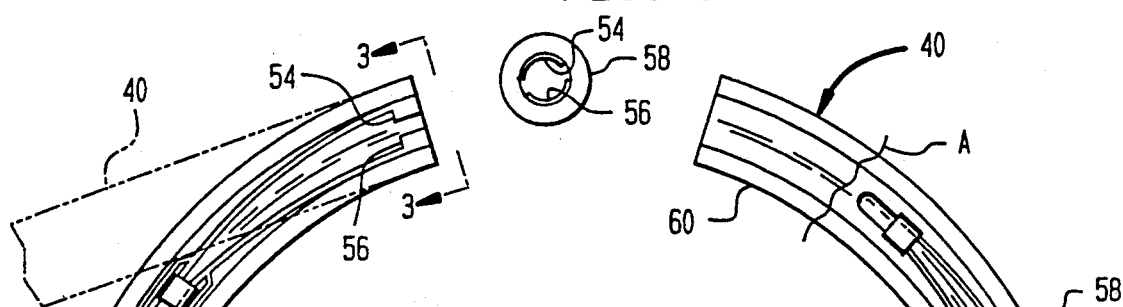
FIG. 3 is a view in the direction of arrows 3—3 in FIG. 2.
Figure 2:
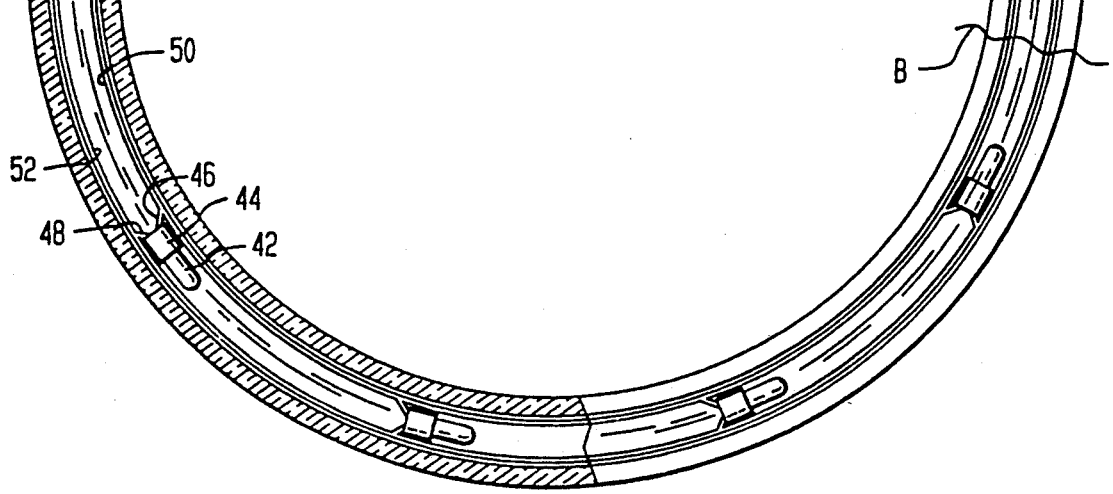
FIG. 2 is a side elevation partially broken view of the transparent flexible plastic tubular member of the present invention.

Referring now to the drawings, the present invention includes a battery housing 10 shown in FIG. 1 and a tube assembly 40 having an elongated, flexible, pliable, thin-wall plastic transparent length of tubing 58 and a plurality of miniature lights 42 mounted in sockets 44 disposed in spaced apart fashion therewithin. The battery housing 10 includes a main housing portion 12 having a hollow interior surface structured to receive a conventional battery power source 14 therein. A stem 16 integral with main housing portion 12 extends longitudinally from the left end thereof as shown.

This stem 16 includes two electrical contacts 20 and 24 disposed on the exterior surface thereof in electrical isolation and opposition one to another. Electrical contact 20 is integral with a coil spring contact 18 which makes electrical contact with the ground or negative (−) end of battery 14. Electrical contact 24 extends into the interior of main housing portion 12 in electrical isolation from spring 18 and extends at 22 along a portion of the length of the interior of housing portion 12 as shown.

The battery housing 10 also includes a threadably removable end plug 34 having its own longitudinally extending stem 38. End plug 34 also includes metal contact plate 36 connected on the inner end surface which engages against the positive (+) output terminal of battery 14 as shown. Contact plate 36 laterally extends to make electrical contact with one end 32 of a metal slide contact 28. Slide contact 28 is connected to switch 26 which is movable within main housing portion 12 in the direction of the arrow within a mating slot in main housing portion 12. Slide contact 28 includes a dimple or protrusion 30 which is in continual biased contact against contact portion 22. Thus, when slide contact 28 is in the position shown in solid lines, a completed circuit is made between the positive (+) output of battery 14 and contact 24. Likewise, when switch 26 is moved in the direction of the arrow, end 32 (in phantom) is disconnected from contact plate 36 and this electrical circuit is broken.

Stems 16 and 38 are sized so as to snugly slidably fit into the ends of transparent tube 58. One end of transparent tube 58 includes arcuate electrical contacts 54 and 56 which are sized so as to make electrical contact with contact terminals 20 and 24 on stem 16. Suitable lengths of flexible wire conduits 50 and 52 then extend along substantially the entire length of transparent tube 58. Each bulb socket 44 is electrically connected to the two wire conduits 50 and 52 by jumpers shown typically at 46 and 48.

By this arrangement, then, when the end of transparent tube 58 which carries contacts 54 and 56 is slidably engaged over stem 16, a completed electrical circuit is made between contacts 20 and 24 and all of the miniature bulbs 42 contained within and extending along the interior surface of transparent tube 58. Thus, even without the other end of transparent tube 58 being connected onto stem 38, the miniature lights 42 may be activated by the appropriate positioning of switch 26.

The present invention also provides for the quick and easy shortening in length of transparent tube 58 by severing or cutting therethrough along any desired transection point shown typically at either A or B. The end portion 60 of transparent tube 58 beyond transection line A is provided without miniature lights 42 or electrical conduits 50 and 52 contained therein to facilitate minor shortening. However, should more substantially shortening of transparent tube 40 be desired such as through transection line B, the miniature lights 42 and circuitry contained within the remaining major portion of transparent tube 58 are left fully intact and operable without additional wiring repair required because the entire circuitry is parallel or "lap" wired.

The present invention provides for an additional benefit in that the user may separately purchase tubular lighting assemblies 40 of various transparent colors and different colored miniature bulbs 42. Likewise, should one or more of the miniature bulbs 42 burn out, the tubular lighting assembly 40 may be easily replaced without the need for purchasing an additional battery housing 10.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. An illuminated collar for pets comprising:

an elongated flexible, pliable, thin wall, transparent plastic display tube open at each end and having a smooth exterior surface;

two spaced apart flexible electrical conduits electrically isolated one from another and generally coextensive with said tube;

a plurality of spaced apart miniature lights electrically connected in parallel between said two electrical conduits and extending within and along substantially the entire length of said tube;

a small housing for removably retaining a battery power source and having a first stem axially extending from an end thereof and a removable plug at the other end thereof, said plug having a second stem extending in the opposite direction from, and generally coaxial with, said first stem;

said first stem having two opposing, spaced apart exterior electrical contacts thereon in controlled electrical communication with said battery source by an electrical switch;

said electrical switch positioned on said housing and structured for connecting said battery source to said two electrical contacts;

each end of said tube sized for snug slidable engagement over one said stem forming said collar with said housing;

said electrical conduits each having an exposed surface at one end of said tube structured to make an electrical connection with one said electrical contact when one end of said tube is slid over said first stem.

2. An illuminated collar for pets as set forth in claim 1, wherein:

said collar is severable at any point along said tube without loss of illuminating operability.

3. An illuminated collar for pets as set forth in claim 2, wherein:

said tube is decoratively colored.

* * * * *